Dec. 26, 1972   D. W. TURNER   3,707,458

ELECTRIC TREATER WITH PROTECTED INSULATORS

Filed Nov. 26, 1971   2 Sheets-Sheet 1

INVENTOR
DELBER W. TURNER
BY Emil J. Bednar
ATTORNEY

INVENTOR
DELBER W. TURNER
BY Emil J. Bednar
ATTORNEY

United States Patent Office 3,707,458
Patented Dec. 26, 1972

3,707,458
ELECTRIC TREATER WITH PROTECTED INSULATORS
Delber W. Turner, Houston, Tex., assignor to Petrolite Corporation, St. Louis, Mo.
Filed Nov. 26, 1971, Ser. No. 202,213
Int. Cl. B01d 13/02
U.S. Cl. 204—308                15 Claims

ABSTRACT OF THE DISCLOSURE

A system for electrically treating emulsions in a vessel containing inlets and outlets, and an electric field formed by an energized electrode connected to an external transformer. A first conduit extends upwardly from the vessel to a branch conduit which connects to a pair of arm conduits extending downwardly to closed ends. A support rod extends in the first conduit from the energized electrode and connects through a horizontal support rod to an arm support rod in each conduit. Each arm support rod is secured to the top of a cylindrical insulator resting within a socket upon the closed end of the arm conduit. Heat exchanger means are associated with the arm conduits at a position space from the branch conduit. The heat exchanger means create a temperature gradient between the insulators and the interior of the vessel. The liquid in the vessel can be at elevated temperatures (e.g., 500° F.) while the insulators remain at relatively low temperatures (e.g., 100° F.) during electrical resolution of emulsions.

BACKGROUND OF THE INVENTION

(1) Field of the invention

This invention relates to apparatus for resolution of emulsions consisting of immiscible external and internal phases. More particularly, the invention relates to electric treatment of oil-continuous emulsions containing a dispersed aqueous phase.

(2) Description of the prior art

For many years, electrical fields have been employed in suitable structures for resolving emulsions formed of an internal dispersed phase, such as water, caustic or acid etc., and a continuous external hydrocarbon phase, such as crude oil. The emulsions are subjected to a high voltage field which causes the internal phase to coalesce. The term "coalesce" as used herein refers to the agglomeration of the dispersed internal phase while in-situ in the continuous external phase. In the electric field, sufficiently large particle sizes of the internal phase are created which sizes can readily separate from the external phase by differences in their specific gravities. Many types of electric treaters can be employed in the electrical treatment of oil-continuous emulsions for removing the dispersed aqueous phase. In conventional treaters, the high voltage applied to electrodes that create the electric field is usually between about 11,000 volts and about 33,000 volts. However, the energizing potentials may be above 33,000 volts in some instances. The potential may be provided by either A.C. or D.C. power sources. According to conventional practices, voltage gradients established between electrodes are usually in the range of between about 2.5 kv. and about 8.5 kv. per inch of spacing therebetween.

Electric treaters may be used solely for dehydrating purposes. The addition of a small amount of fresh water to the emulsion to be treated will allow the electric treater to be used in "desalting." For example, a crude oil stream may be intermixed with between 3 and 15% fresh water and then subjected to electrical field treatment which produces an oil-continuous phase relatively free of the dispersed water phase and contaminating salt crystals, brine, etc. Other variations of dehydration-desalting treatments in electric treaters are well known.

Electric treaters have relatively similar constructions. For example, the treater is usually constructed in a pressure-type metal vessel having at least one electrical entrance bushing for conducting the high-voltage energizing potential from an external power source to one or more energized electrodes mounted in electrical isolation within the container. The entrance bushing is exposed to the temperature and pressure of the liquid in the electric treater. Each energized electrode is submerged in the body of the oil-continuous liquid phase. The emulsion is introduced into the container for movement into the electric field about the energized electrode. The electric field produces coalescence of the dispersed aqueous phase and a body of water accumulates in the lower portion of the vessel. The resultant dehydrated oil-continuous phase collects at the upper portion of the vessel for removal through an oil outlet. The body of water is removed at regulated rates through a water outlet.

Each energized electrode is suspended within the metal vessel by supports containing an insulator. Many years ago, the insulators were formed of various materials such as porcelain and vulcanized rubber material containing whiting. In more recent times, these insulators have been constructed of polymer materials and polytetrafluoroethylene is preferred as the insulating material. This polymer is available under the trademark Teflon® insulating material. Insulators of this material have supported relatively heavy energized electrode assemblies at temperatures approaching 350° F. and at electrical potentials up to 50 kv. for extended periods of time in complete safety.

The insulators for suspending each energized electrode within the metal vessel of the electrical treater are generally maintained in tension. However, arrangements have been proposed for employing these insulators in a compression mounting. Both types of mountings can provide satisfactory service with a proper design of the applied forces on the insulating material but serious consideration must be given to the special characteristics of these materials. For example, Teflon insulating material does not return precisely to its original configuration after being loaded to high stress and sheer factors. In addition, relatively light loading factors but high temperatures (e.g., 500° F.) can cause a physical breakdown of the insulating material. The breakdown induces electrical arcs, or other types of dielectric problems, across the insulating material which will short-circuit the energized electrode to the metal vessel of the electrical treater. These problems increase in severity as the temperature and pressure operating conditions of the electrical treater are increased. For example, the desalting of crude oil, which began in the late 1930's, was usually undertaken at temperatures of 180° F. In each of the following decades, the temperature and pressure of the crude oil being treated increased greatly. By the late 1960's, the desalting of crude oil was being carried out at temperatures of 300° F. on a routine basis in everyday refinery operations. This trend of increasing temperatures continues so that in the early 1970's, crude oil is desalted at temperatures above 350° F. and will probably be close to 400° F. before this decade ends.

It will be apparent that an insulating material of the best quality, such as the Teflon® insulation, cannot operate with unrestricted operating temperatures, pressures and applied potentials without eventual electrical-mechanical injury. For example, the Teflon insulating material has a thermal expansion coefficient several times that of the steel components with which it is associated in the insulating mounting of the energized electrode. Additionally, this polymer material suffers structural deformation in a cycling of operating temperatures. Naturally, subjecting the insulating material to elevated temperatures eventually will create a structural defect in the mechanical and insulating quality of the polymer material. These injuries may create an electrical arc which destroys a portion of the polymer insulator by its conversion into a gas. As a result, there is a loss of insulating quality in a polymer insulating material and can produce a short-circuit between the energized electrode and the metal vessel of the electrical treater. The sources of power associated with modern electrical treaters carry protective devices which terminate the application of power upon a short-circuit condition. However, the defective insulators must be replaced in the electrical treaters to continue proper operation. Obviously, the increased temperatures of the liquid in the treater causes the possibility of electrical and mechanical defects in the insulators to increase rather rapidly.

It is desirable to protect the insulators as liquid temperatures and pressures are increased in operation of electrical treaters. A mechanical barrier to isolate the liquid between the electrical treater and the insulators is impractical. The barrier is subject to the very same mechanical and severe electrical stresses which lead to dielectric breakdown and short-circuits in the insulating material. Coolers may be placed around exterior housings of the insulators rising above the metal vessel. These structures are relatively impractical because within the vessel of the electrical treater an unending supply of hot liquid circulates in contact with the insulators. There is a need for maintaining the insulators in a relative cool environment compared to the liquid within the electrical treater without the problems associated with mechanical barriers and high capacity coolers etc. In addition, it is especially desirable that the insulators be maintained under a compression loading rather than in a tension loading environment. Whichever mounting environment is employed, the insulators should be readily changed when a mechanical or electrical defect arises and might short-circuit the energized electrode to the metal vessel of the electrical treater. The present invention provides a solution to these problems by a novel conduit interconnection of the insulators with the electrical treating vessel.

SUMMARY OF THE INVENTION

In accordance with this invention, there is provided a system for electrically treating an oil-continuous emulsion containing dispersed phase contaminating substances. The system comprises a vessel containing inlet and outlet means for passing fluids therethrough. Electrode means are connected to an external source of electrical potential for creating an electrical field within the vessel. These electrode means include an energized electrode mounted in electrical isolation from the vessel. A first conduit extends upwardly from the vessel to a branch conduit. The branch conduit connects to an arm conduit which extends downwardly at least in part and terminates in a closed end. The closed end is in fluid communication with the interior of the vessel. A support rod extends from the energized electrode upwardly to the first conduit and connects to an arm support rod in each arm conduit. The arm support rod is secured to insulator means in each arm conduit at a location spaced from the branch conduit. Heat exchanger means are associated with each arm conduit at a position spaced from the branch conduit. These heat exchanger means create a temperature gradient between the insulator means and the interior of the vessel.

DESCRIPTION OF SPECIFIC EMBODIMENTS

Figure 1:
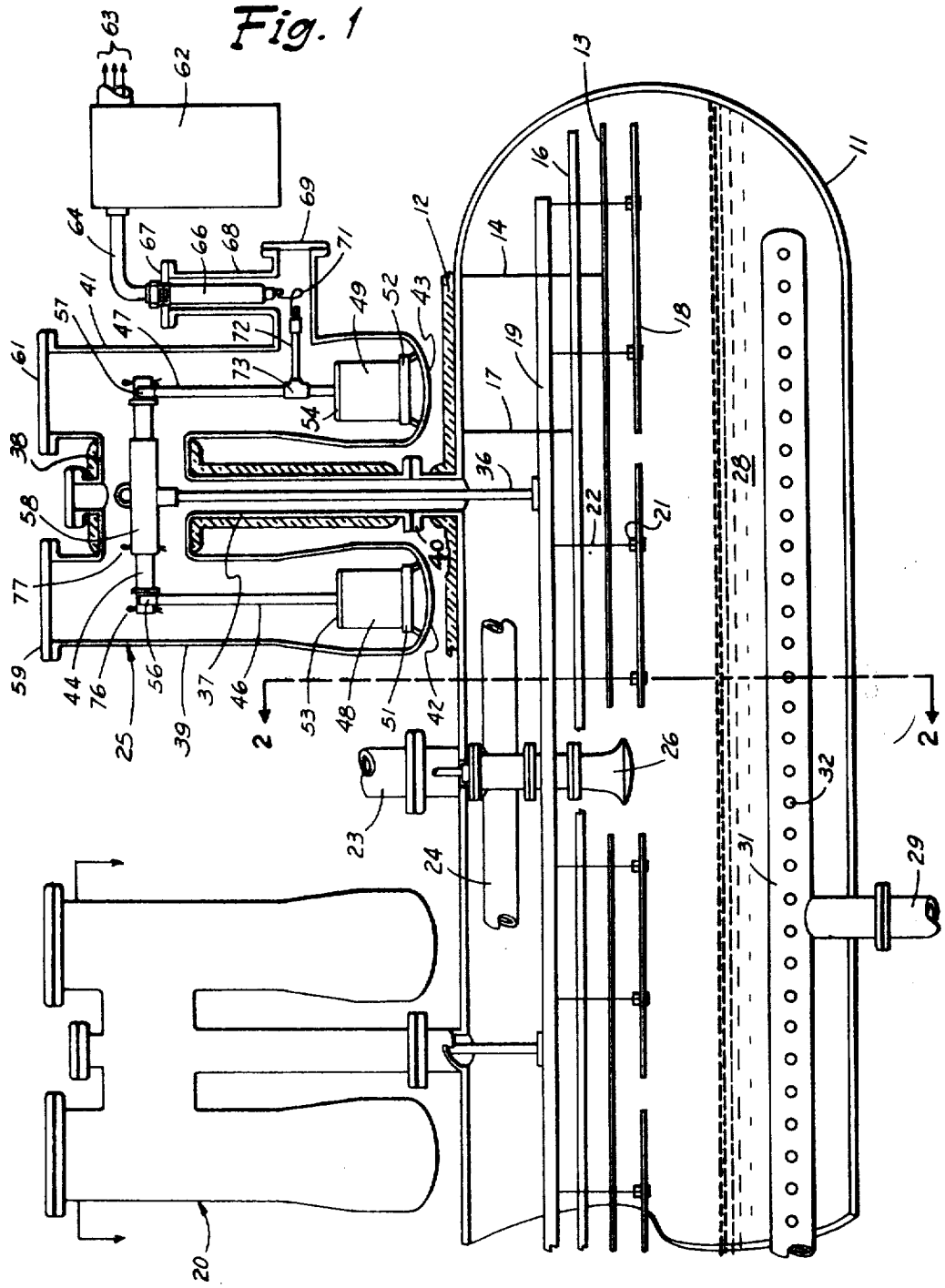
FIG. 1 is a partial vertical section of an electrical treating system of the present invention.

Referring now to FIG. 1 of the drawings, there is shown a system of the present invention for electrically treating an emulsion containing dispersed phase contaminating substances in a continuous external phase. For example, the emulsion (liquid) may consist of an aqueous phase dispersed within a continuous crude oil phase. The system includes a vessel with metallic sidewalls and enclosed ends to contain the emulsion. The vessel 11 may be of any configuration but for illustrative purposes is shown as a horizontally elongated cylindrical metal tank. The vessel 11 is usually surrounded with a layer of insulation 12 to reduce the loss of heat from the liquid being treated. Electrodes are mounted within the vessel 11 for creating an electric field to resolve the emulsion into the oil continuous phase and a separated aqueous phase. Generally, the electrodes extend throughout the horizontal extent of the vessel 11.

The electrodes are arranged to create an electric field in the vessel 11. For illustration, an upper grounded electrode 13 is susended by hanger rods 14 from the top of the vessel 11. The hanger rods 14 pass through the energized electrode assembly in electrical isolation. The electrode 13 may be a foraminous lattice arrangement of metallic grounded rods which are oriented in a horizontal plane. Above the grounded electrode 13 can be positioned an electrode shield 16 which is supported by hanger rods 17 to the top of the vessel 11. The hanger rods 17 also pass through the energized electrode assembly in electrical isolation. The electrode shield 16 may be a solid horizontal steel plate to segregate a dry oil zone in the upper portion of the vessel 11. An energized electrode 18 is mounted a short distance below the grounded electrode 13. The energized electrode 18 is suspended from longitudinal I beams 19 by hangers 21 and interconnecting hanger rods 22 which pass in electrical isolation through openings in the grounded electrode 13 and the electrode shield 16. The energized electrode 18 is constructed similarly to the electrode 13. For example, the electrode 18 can be longitudinal and transverse metal rods welded into a foraminous lattice which is oriented in a horizontal plane. The beam 19 is supported in electrical isolation to the vessel 11 by novel structures which will be described hereinafter. The energized electrode 18 is connected to an external power source which creates an electrical field between the electrodes.

Figure 2:
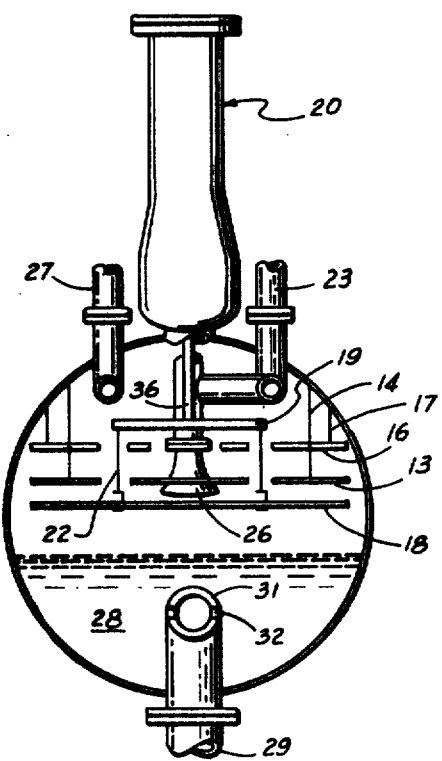
FIG. 2 is a cross section taken along line 2—2 of FIG. 1.

An inlet 23 atop the vessel 11 connects to a horizontally extending distributor inlet pipe 24 carrying one or more distributor nozzle assemblies 26. The distributor nozzle assembly 26 distributes emulsion horizontally between the grounded electrode 13 and the energized electrode 18. Depending upon the volumetric capacity of the vessel 11, a plurality of the distributor inlet nozzles 26 may be employed and spaced throughout the length of the vessel 11. Passage of the emulsion in the electrical field between the electrodes causes the emulsion to be resolved into a dry oil phase which is removed through an outlet 27 (which is shown in FIG. 2). The coalesced water falls to the bottom of the vessel 11 and accumulates as a body of water 28. Accumulated water is removed through a water outlet 29 connected to a horizontally extending water collector pipe 31 carrying a plurality of holes 32. The oil-water interface of body of water 28 may be maintained relatively constantly in the vessel 11 by the usual level control means associated with the water outlet 29. These arrangements are omitted from the drawings and description for purposes of simplication. Other arrangements of the emulsion inlet, and oil and water outlets may be employed with the present electrical treater, if desired.

Referring particularly to the upper portion of FIG. 1, novel assemblies 20 and 25 are shown for protecting the insulators which electrically isolate the energized electrode 18 from the vessel 11. In relatively small capacity vessels, only one assembly 25 may be employed. However, where an elongated cylindrical vessel 11 is employed as shown in FIG. 1, a plurality of assemblies 20 and 25 may be employed in spaced relationship along the longitudinal extent of the vessel. The only criterion as to the number of these assemblies is that they maintain the energized electrode 18 properly positioned within the electrical treater during normal operations without any shifting to a position causing a short-circuit condition to surrounding grounded components.

The assembly 25 will be described in detail and varies from the assembly 20 only in a side conduit pocket in which an entrance bushing can be mounted. The assembly 25 supports the energized electrode 18, in electrical isolation on insulators, by the use of a support rod 36 connected at one end to the energized electrode 18.

The support rod 36 extends from the electrode 18 upwardly through a conduit 37 interconnected to the vessel 11 by flanged connection 40. The conduit 37 terminates in an upright portion in a branch conduit 38. The branch conduit 38 connects to one or more arm conduits 39 and 41 which extend downwardly, at least in part, to terminate at enclosed ends 42 and 43, respectively. The support rod 36 connects to a horizontal support rod 44 which extends horizontally into each of the arm conduits 39 and 41. Arm support rods 46 and 47, positioned within arm conduits 39 and 41, respectively, connect at their upper extremities to the ends of horizontal support rod 44. The arm support rods 46 and 47 are secured at their lower ends to insulators 48 and 49 which are carried upon the closed ends 42 and 43 of the arm conduits.

Figure 3:
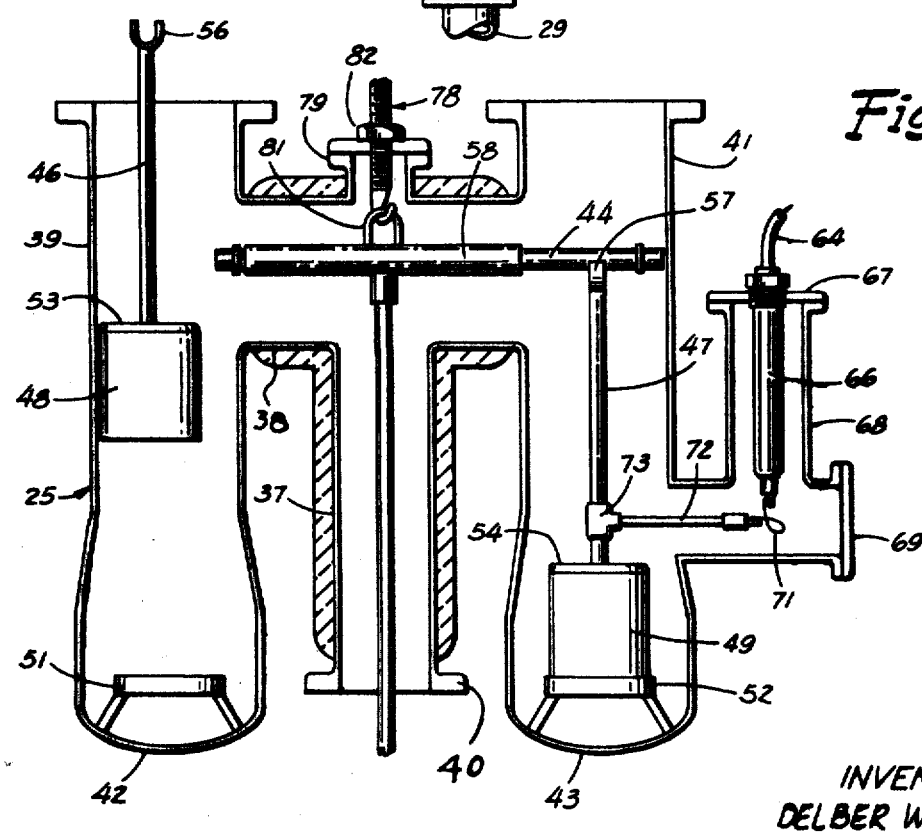
FIG. 3 is a partial enlarged cross-section, in a disassembled state, of the insulator suspension system shown atop the electrical treater illustrated in FIG. 1.

Many arrangements may be employed for the described connections to the support rod 36 which support the energized electrode 18 in its proper horizontal, vertical and longitudinal orientation within the vessel 11 while the electrical field resolves the emulsion introduced by the distributor nozzle assembly 26. For example, the support rod 36, the horizontal support rod 44 and the arm support rods 46 and 47 can be rigidly secured by welding, bolting, or the like, so that the electrode 18 is held fixedly in position by the insulators 48 and 49 within the vessel 11. However, other arrangements may be employed for this purpose. One particular arrangement is preferred since it permits the ready replacement of the insulators 48 and 49 should any mechanical or electrical problems arise in them. For this purpose, the insulators 48 and 49 may be cylindrical segments of Teflon® insulating material which are releasably mounted in sockets 51 and 52 secured to the closed ends 42 and 43, respectively. The arm support rods 46 and 47 carry end flanges 53 and 54 which can be screwed atop the insulators 48 and 49. As best seen in FIG. 3, the upper portions of the arm support rods 46 and 47 carry saddle ends 56 and 57 to receive the ends of the horizontal support rod 44. Preferably, the horizontal support rod 44 is mounted in a tubular mount 58 so that it can be slidably displaced in a horizontal plane relative to the support rod 36. The saddle ends of the arm support rods 36 and 37 engage the horizontal rod 44, and in turn they support the support rod 36 connected to the energized electrode 18. The entire weight and positioning of the energized electrode 18 therefore is transmitted by the various support rods to the insulators 48 and 49 which receive the loading in compression.

In addition to the described structure providing a support for the energized electrode 18, the novel assembly 25 also provides a gravity-liquid heat barrier in the liquid extending within the vessel 11 to the closed ends 42 and 43 of the arm conduits. More particularly, this barrier or thermal dam provides a dynamic barrier which prevents a cooler fluid surrounding the insulators 48 and 49 from circulating and intermingling with the heated liquid in the vessel 11. For this purpose, heat exchanger means are associated with the arm conduits adjacent the closed ends containing the insulators. The conduit 37 will usually be insulated in a like manner to the vessel 11. The arm conduits 39 and 41 are uninsulated below the branch conduit 38 to form heat exchanger means which create a temperature gradient between liquid about the insulators 48 and 49 and the liquid interior of the vessel 11. If desired, the lower portions of the arm conduits 39 and 41 may contain other types of heat exchangers, such as cooling coils, fins, jackets or the like. Generally, air cooling on exposed conduit surfaces will be sufficient to provide the necessary heat exchanger function for the present invention.

The downward movement of the heated liquid through the branch conduit 38 into the arm conduits 39 and 41 is prevented by a gravity-liquid heat barrier, or thermal dam. This barrier prevents the heated liquid in the vessel 11 from circulating through the conduits 37 and 38 to intermix with the cooler liquid in the lower portions of the arm conduits 39 and 41. The heated liquid from the vessel 11 passes upwardly in a circulating flow through the conduit 37 and into the branch conduit 38. The heated liquid, being less dense, will not circulate into the downwardly extending portions of the arm conduits 39 and 41 which portions always project at a downward angle from the branch conduit 38. The cooler liquid surrounding the insulators 48 and 49 is more dense, and is prevented by the specific gravity differential between the heated and cool liquids, from an upward circulation to intermix with the heated less-dense liquid in the branch conduit 38. The cooler liquid seeks only to move downwardly towards the closed ends 42 and 43 of the arm conduits. The heated liquid from the vessel 11 seeks only to move upwardly into the branch conduit 38. Thus, a thermal dam is formed at the hot-cold liquids meeting adjacent the branch conduit 38. For all practical purposes, there is no significant intermingling of the hot and cold liquids. The only significant transfer of heat energy between these liquids is by conduction across the heat barrier and this heat transfer amount is relatively small.

It is advantageous in some installations to enhance the thermal dam effect, to prevent excessive heat loss of the liquid in the vessel 11, and for other reasons, to insulate the conduit 37 and branch conduit 38. For example, the liquid within the vessel 11 and the branch conduit 38 can be held at a temperature of 350° F. while the temperature of the liquid within the lower portion of the arm conduits adjacent the insulators 48 and 49 can be maintained at 98° F. by air-cooling by the heat exchanger means to compensate for the slight conduction heating effect across the heat barrier.

The conduits 37, 38, 39 and 41 may be any type of piping materials. In the arrangement of FIG. 1, these conduits are rigid tubing interconnected by flanged and welded connections. The branch conduit 38 is a T welded at its side connection to the conduit 37. A pair of T's are welded at their side connections to the conduit 38 and at one of their ends to the arm conduits. The arm conduits are pipe segments welded to enlarged bell lower portions closed by end caps. Preferably, the upper extremities of the arm conduits 39 and 41 are closed by flanged covers 59 and 61. The covers 59 and 61 can be secured in any fashion, such as bolting.

The electrode 18 is energized from a source of electrical potential external of the vessel 11. The source of electrical potential can provide either A.C. or D.C. current and at suitable elevated potentials for creating the electrical field for resolving the emulsion within the vessel 11. In the resolution of crude oil emulsions, a source of potential can be an A.C. power transformer 62 mounted adjacent the vessel 11. The transformer 62 connects with a primary winding to A.C. feeder lines 63 and by a secondary winding provides elevated potentials (e.g., 11 kv.), to be applied between the energized electrode 18 and grounded electrode 13. The transformer 62 usually has the secondary winding grounded at one terminal at the vessel 11 (and the grounded electrode 13) and another terminal connected to the energized electrode 18. The ungrounded secondary winding terminal on the transformer 62 connects, by a cable 64, to an entrance bushing 66 carried in a flange 67 on top of a pipe T 68. The T 68 is connected at one end to the arm conduit 41. The other end of the T 68 is covered by a flange 69 secured by bolting or the like. The entrance bushing 66 can be of any suitable construction. However, construction of the bushing 66 in accordance with U.S. Pat. 3,303,262 produces a device of superior utility. With the described arrangement, high potential current is conducted through cable 64 and entrance bushing 66 to a braid 71, and then by a conductor rod 72 connected to a T 73 secured into arm support rod 47. The high potential current from the transformer 62 is conducted thereafter through the metallic support rods to the energized electrode 18. Other arrangements for energization of the energized electrode 18 may be employed, if desired. However, the described arrangement also protects the entrance bushing 66 against excessive liquid temperatures by the thermal dam effect created in the novel assembly 25.

It may be desirable during start-up or in certain conditions of operation, that fluids be withdrawn from the upper and lower portions of the arm conduits 39 in order to protect the insulators 48 and 49 against untended condensations of moisture or for other reasons. For these purposes, valved connections are connected to the arm conduits 38 and 39 whereby fluid is selectively vented from the upper and lower portions of these numbers. Other arrangements for removing fluid can be employed, if desired, from the arm conduits 39 and 41.

The system of the present invention was tested experimentally with a laboratory equipment set-up representing the thermal dam effect in the novel assembly of the present invention. Temperatures within the branch conduit 38 were maintained in equilibrium at about 350° F. Air cooling was provided the lower extremity of the downwardly extending arm conduit laboratory components having a length of a few inches over three feet. The zone of heated liquid extended downwardly from the branch conduit 38 only about three inches. The closed end of the arm conduit component was at a temperature of 98° F. and at 1, 2, and 3 feet above this closed end, the temperatures were respectively 100° F., 110° F., and 175° F. Thus, the thermal dam effect provided by the present novel assembly for supporting the energized electrode 18 is well adapted to protect the insulators 48 and 49 against adverse elevated temperatures present in the liquid being processed in the vessel 11.

The support mechanism for the energized electrode 18 is shown with the insulators 48 and 49 maintained in a compression loading. It is envisioned that the arm conduits may each connect at their lower ends to an upstanding pipe by an elbow connection. Insulators could then be suspended from the tops of these upstanding portions through rods rigidly secured to the arm support rods 46 and 47, and thereby, the insulators would be in a tension loading. However, the thermal dam effects of the interconnection between the branch conduit 38 and the downwardly depending arm conduits 39 and 41 would protect such insulators against thermal damage in the same manner as for that structure shown in FIG. 1. However the arrangement shown in FIG. 1 has several advantages.

The structure in FIG. 1 is shown in FIG. 3 in greater detail. The flange covers 59 and 61 are shown removed from the arm conduits 39 and 41 and safety pins 76 and 77 are also removed. A lifting screw assembly 78 is positioned on top a central spool piece 79 carried on the branch conduit 38. The screw assembly 78 engages a ring 81 on top of the tubing 58. Nut 82 is then rotated to lift the support rod 36 a sufficient distance that the weight of the energized electrode 18 is released from the saddle ends 56 and 57. Then, the horizontal support rod 44 is moved in tubing mounting 58 to the right a sufficient distance that the arm support rod 46 carrying insulator 48 can be vertically removed from the socket 51 upon closed bottom 42. The arm support rod 46 is shown rotated 90° to illustrate the construction of the saddle end 57. The arm support rod 46 and insulator 48 are then completely removed from the arm conduit 39 for inspection, replacement, or for other reasons. A new arm support rod and insulator can be installed merely by reversing the procedure. After installation, the flange covers 59 and 61 are replaced on the arm conduit. The nut 82 is rotated to release the screw assembly 78 and lower the horizontal support rod 44 into engagement with the saddle ends 56 and 57. The weight of the energized electrode 18 is again exerted upon the insulators 48 and 49 in a compression loading. Thus, the insulators are not only protected by the thermal dam construction of the described arrangement from excessive liquid temperatures but a ready interchange of the arm support rods and insulators can be made should there by any mechanical or electrical injuries to them.

As earlier mentioned, the present assembly envisions that only one arm conduit 39 may be employed for each conduit 37 which carries the support rod 36. However, it is preferred that a pair of arm conduits be employed so that the loading of the electrode 18 is more uniformly applied upon each of the insulators. A plurality of the arm conduits may be placed about the conduit 37, when necessary. For example, a single assembly 25 may be desired to be employed in the vessel 11. Therefore, four arm conduits can be connected with the branch conduit 38 into a four-way T resembling a cross when viewed from the top. Other numbers of the arm conduits may be employed as is desired for construction purposes.

The present embodiments have been described for use where the temperature of the liquid within the vessel 11 is greatly above the temperature of the liquid surrounding the insulators 48 and 49. However, the present system will operate in a reversed manner. For example, the vessel 11 can be filled with cryogenic liquid and the downwardly extending portion of the arm conduits carry heat exchanger means which heat the liquid surrounding the insulators. Thus, the electrical insulators are maintained by the heat exchanger means at a temperature gradient favorable to their operation compared to the temperature of the liquid within the vessel 11.

It will be apparent that only that portion of the arm conduits adjacent the branch conduit need to extend downwardly. It is immaterial how many bends, vertical portions, and downwardly extended portions are intermediate such first downwardly extending portion of the arm conduits and the closed ends. The thermal dam effect occurs at the first downward portion adjacent the branch conduit 38. The downard extending portion need not extend downwardly vertically but only at such a downward angle that it is not a horizontal interconnection between the arm conduits and adjacent the branch conduit 38.

From the foregoing, it will be apparent that there has been provided a system for electrical resolution of emulsions which is well adapted to satisfy the purposes of the present invention. Changes may be made to the system without departing from the spirit of this invention. The foregoing description is to be taken as illustrative of the present invention.

What is claimed is:

1. A system for electrically treating an oil-continuous emulsion containing dispersed phase contaminating substances comprising:
   (a) a vessel;
   (b) said vessel containing inlet and outlet means for passing fluids through said vessel;
   (c) electrode means connectable to an external source of electrical potential for creating an electric field within said vessel;
   (d) said electrode means including an energized electrode mounted in electrical isolation from said vessel;

(e) a first conduit extending upwardly from said vessel to a branch conduit connected to an arm conduit extending downwardly at least in part and terminating in a closed end, said closed end being in fluid communication with the interior of said vessel;

(f) a support rod extending from said energized electrode upwardly through said first conduit and connected to an arm support rod in said arm conduit, and said arm support rod secured to insulator means in said arm conduit at a location spaced from said branch conduit; and (g) heat exchanger means associated with said arm conduit at a position spaced from said branch conduit, and said heat exchanger means creating a temperature gradient between said insulator means and the interior of said vessel.

2. The system of claim 1 wherein a side conduit connects to said arm conduit at a location spaced from said branch conduit, and said side conduit carries an entrance bushing connected interiorly by an electrical conductor to said support rod and externally to said external source of electrical potential.

3. The system of claim 1 wherein said arm conduit extends downwardly in parallel relationship to said first conduit from said branch conduit to said closed end of said arm conduit.

4. The system of claim 1 wherein said insulator means are mounted adjacent said closed end of said arm conduit and support said arm support rod in a compression loading.

5. The system of claim 4 wherein said insulator means are releasably mounted in a socket carried in said closed end of said arm conduit whereby said insulator means are removable vertically through said arm conduit.

6. The system of claim 1 wherein said heat exchanger means provide a temperature gradient at said insulator means more favorable to its operation than the temperature within said vessel during electrical treatment of emulsion.

7. A system for electrically treating an oil-continuous emulsion containing dispersed phase contaminating substances comprising:

(a) a vessel;

(b) said vessel containing inlet and outlet means for passing fluids through said vessel;

(c) electrode means connectable to an external source of electrical potential for creating an electric field within said vessel;

(d) said electrode means including an energized electrode mounted in electrical isolation from said vessel;

(e) a first conduit extending upwardly from said vessel to a branch conduit connecting horizontally to a plurality of arm conduits extending downwardly at least in part and terminating in closed ends, said closed ends being in fluid communication with the interior of said vessel;

(f) a support rod extending from said energized electrode upwardly through said first conduit and secured to a horizontal support rod, arm support rods in said arm conduits secured at one of their ends to said horizontal support rod and secured at their other ends to insulator means at locations spaced from said branch conduit; and (g) heat exchanger means associated with each of said arm conduits at positions spaced from said branch conduit, and said heat exchanger means creating a temperature gradient between said insulator means and the interior of said vessel.

8. The system of claim 7 wherein a pair of arm conduits extend in parallel relationship to said first conduit and equally spaced therefrom with said insulating means carried adjacent said closed ends of said arm conduits.

9. The system of claim 7 wherein said insulating means are releasably mounted in sockets carried on said closed ends of said arm conduits, and the upper extremities of said arm conduits carry removable closure parts to facilitate removal of said insulating means from said arm conduits.

10. The system of claim 8 wherein said horizontal support rod is slidably mounted for sidewise movement on said support rod, and said arm support rods at their upper extremities carry a releasable connection to said horizontal support rod whereby said horizontal support rod can be released from said arm support rods, and said arm support rods then removed from said arm conduits to facilitate removal of said insulating means.

11. The system of claim 10 wherein said releasable connection on said arm support rods is a saddle end adapted to engage an end portion on said horizontal support rod.

12. The system of claim 7 wherein a pair of arm conduits extend in parallel relationship to said first conduit and equally spaced therefrom with said insulating means releasably mounted in sockets carried on said closed ends of said arm conduits, the upper extremities of said arm conduits carrying removable closure parts, said horizontal support rod is slidably mounted for sidewise movement on said support rod, said arm support rods at their upper extremities carrying saddle ends forming a vertical releasable connection to receive end portions on said horizontal support rod, and said first conduit carrying means for raising said horizontal support rod to release said saddle ends from said horizontal support rod whereby said arm support rods and insulating means can be removed from said arm conduits through said closure parts.

13. The system of claim 7 wherein a plurality of first conduits are positioned topside of said vessel.

14. The system of claim 7 wherein said heat exchanger means provide a temperature gradient at said insulator means more favorable to its operation than the temperature within said vessel during electrical treatment of emulsion.

15. A system for electrically treating an oil-continuous emulsion containing dispersed phase contaminating substances comprising:

(a) a vessel;

(b) said vessel containing inlet and outlet means for passing fluids through said vessel;

(c) electrode means connectable to an external source of electrical potential for creating an electric field within said vessel;

(d) said electrode means including an energized electrode mounted in electrical isolation from said vessel;

(e) a plurality of first conduits secured at one of their ends to said vessel and said first conduits each having an upwardly extending portion connected to a branch conduit connecting horizontally to a plurality of arm conduits;

(f) said arm conduits having downwardly extending portions adjacent said branch conduits and terminating in closed ends;

(g) a support rod extending from said energized electrode upwardly through each said first conduit and secured in a slidable mounting to a horizontal support rod positioned in each said branch conduit;

(h) an arm support rod in each said arm conduit secured at its lower end to insulator means releasably mounted in a socket residing on said closed end of each said arm conduit at a location spaced from said branch conduit, and said arm support rod at its other end carrying a saddle end adapted to engage an end portion of said horizontal support rod;

(i) said arm conduits at their upper extremities carry removal closure parts and said first conduits carry means for raising said horizontal support rods to release said saddle ends therefrom whereby said arm support rods and insulator means can be removed through said closure parts from said arm conduits;

(j) valve means connected to said closed ends of said arm conduits whereby fluid may be selectively removed from said arm conduits; and (k) heat exchanger means associated with each of said arm conduits at positions spaced from said branch conduits; and said heat exchanger means creating a temperature gradient between said insulator means and the interior of said vessel.

References Cited

UNITED STATES PATENTS

| | | | |
|---|---|---|---|
| 1,129,466 | 2/1915 | Fortescue | 174—15 BH |
| 1,467,003 | 9/1923 | Land | 174—14 R |
| 1,766,593 | 6/1930 | Bramwell | 174—15 BH |
| 2,686,827 | 8/1954 | Roffee | 174—15 BH |
| 2,742,582 | 4/1956 | Bahn et al. | 174—15 BH |
| 3,269,931 | 8/1966 | Darby et al. | 204—302 |
| 3,341,648 | 9/1967 | Molstedt et al. | 174—15 BH |

JOHN H. MACK, Primary Examiner

T. TUFARIELLO, Assistant Examiner

U.S. Cl. X.R.

204—302